United States Patent [19]
Romick

[11] Patent Number: 6,082,544
[45] Date of Patent: Jul. 4, 2000

[54] MEDICINE UNIT DOSE DISPENSING SYSTEM AND METHOD

[75] Inventor: J. M. Romick, Columbus, Ohio

[73] Assignee: Artromick International, Inc., Columbus, Ohio

[21] Appl. No.: 09/241,170

[22] Filed: Feb. 1, 1999

[51] Int. Cl.[7] ................................................. B65D 85/58
[52] U.S. Cl. ........................... 206/531; 206/534; 206/539
[58] Field of Search .................................. 206/528, 531, 206/534, 534.1, 538, 539, 232, 470, 562

[56] References Cited

U.S. PATENT DOCUMENTS

| | | |
|---|---|---|
| 3,397,671 | 8/1968 | Hartman, Jr. et al. . |
| 3,494,322 | 2/1970 | Dubbels . |
| 3,527,190 | 9/1970 | Hack . |
| 3,530,818 | 9/1970 | Secondino . |
| 3,579,883 | 5/1971 | Hayes . |
| 3,584,598 | 6/1971 | Gayle et al. . |
| 3,587,517 | 6/1971 | Fites . |
| 3,630,171 | 12/1971 | Huck . |
| 3,921,804 | 11/1975 | Tester ....................................... 206/531 |
| 4,039,080 | 8/1977 | Cappuccilli . |
| 4,084,695 | 4/1978 | Halbich . |
| 4,253,572 | 3/1981 | Halbich . |
| 4,372,445 | 2/1983 | Keffeler . |
| 4,384,649 | 5/1983 | Brodsky . |
| 4,817,819 | 4/1989 | Kelly . |
| 4,974,729 | 12/1990 | Steinnagel . |
| 4,998,623 | 3/1991 | Doull . |
| 5,251,757 | 10/1993 | Relyea et al. . |
| 5,265,728 | 11/1993 | Allendorf et al. . |
| 5,323,907 | 6/1994 | Kalvelage . |
| 5,377,839 | 1/1995 | Relyea et al. ............................. 206/531 |
| 5,489,025 | 2/1996 | Romick ..................................... 206/531 |
| 5,542,236 | 8/1996 | Miller . |
| 5,735,406 | 4/1998 | Keffeler .................................... 206/538 |
| 5,878,887 | 3/1999 | Parker et al. ............................. 206/531 |

*Primary Examiner*—Paul T. Sewell
*Assistant Examiner*—Luan K. Bui
*Attorney, Agent, or Firm*—Wood, Herron & Evans, LLP

[57] ABSTRACT

The present invention provides a system for exchanging medication blister strips that includes a reusable dispensing frame that holds a plurality of reusable blister strip cartridges. A medicine filled blister strip having individually sealed spaced blisters is dropped down onto each blister strip cartridge base when a locking arm is in an open position and then is locked thereto when the locking arm is moved into a closed position, the locking arm including an open hold down frame for each individual blister, through which the blister is visually exposed, thereby locating the blister strip in operative assembly with the cartridge. The cartridge also includes a pillbox with an identification card having information indicia, the card being attachable to the top. The information indicia is readable through slots in the top, floor, and dispensing frame floor, and from beneath the dispensing frame floor when the cartridge is functionally engaged with the dispensing frame.

18 Claims, 4 Drawing Sheets

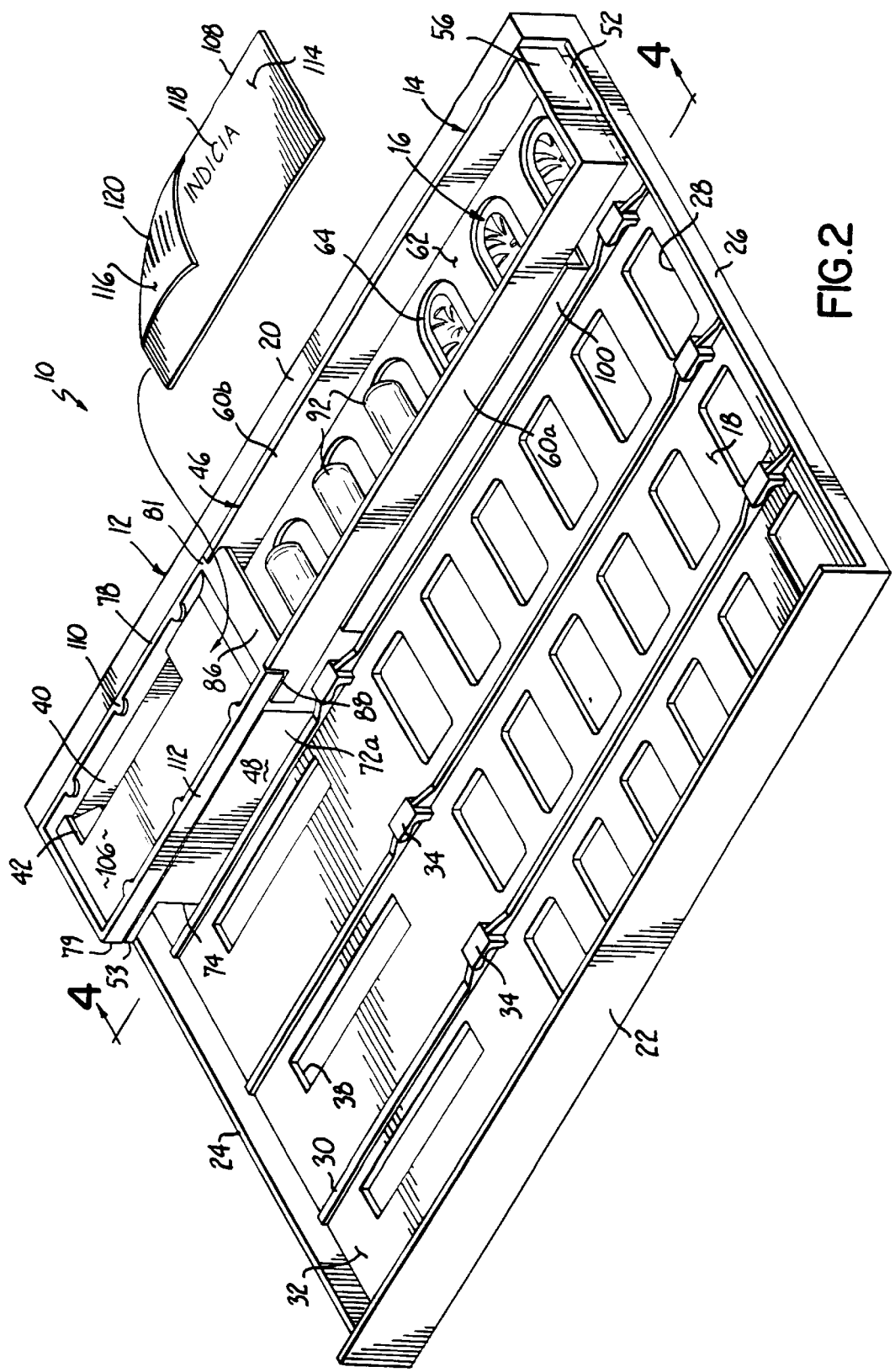

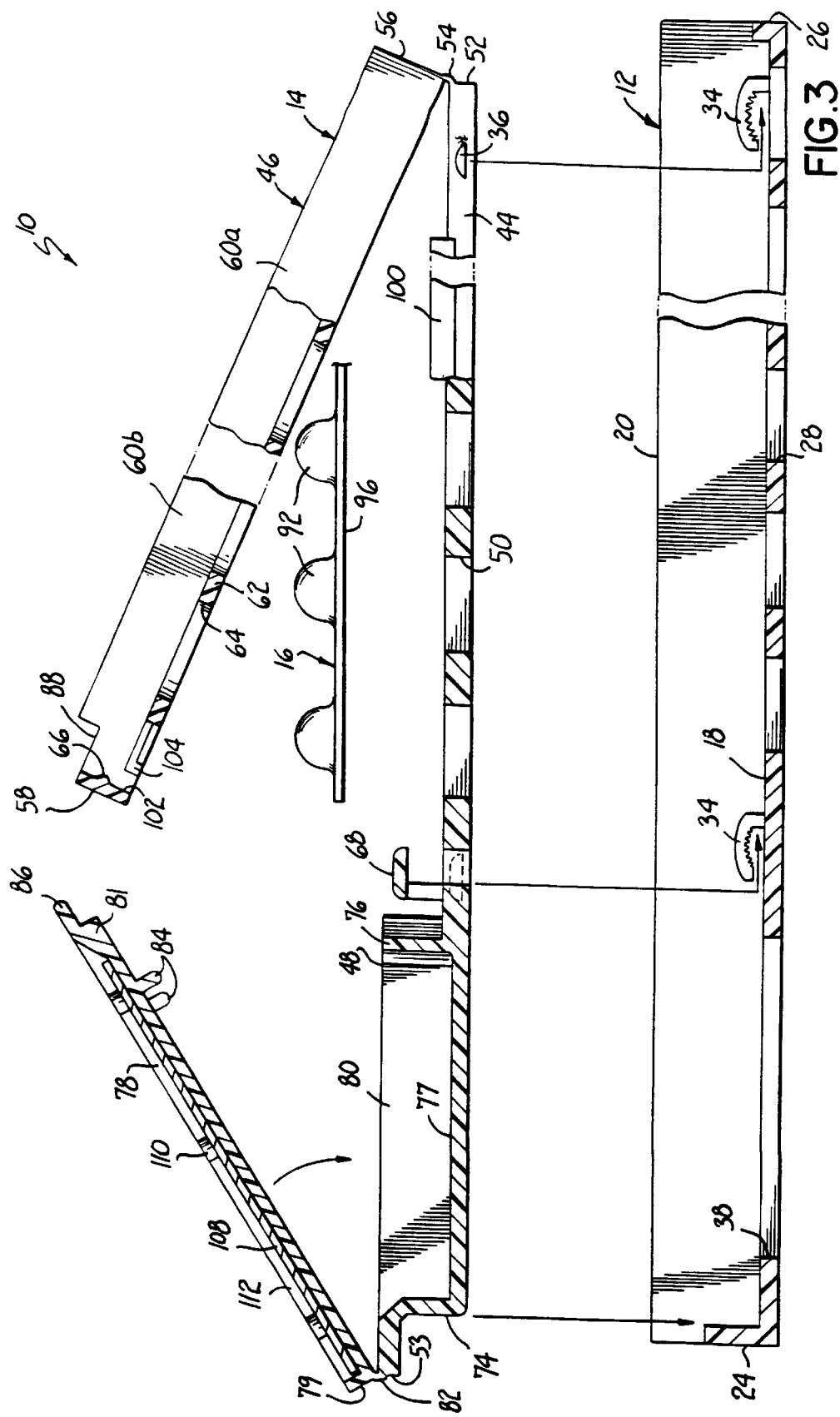

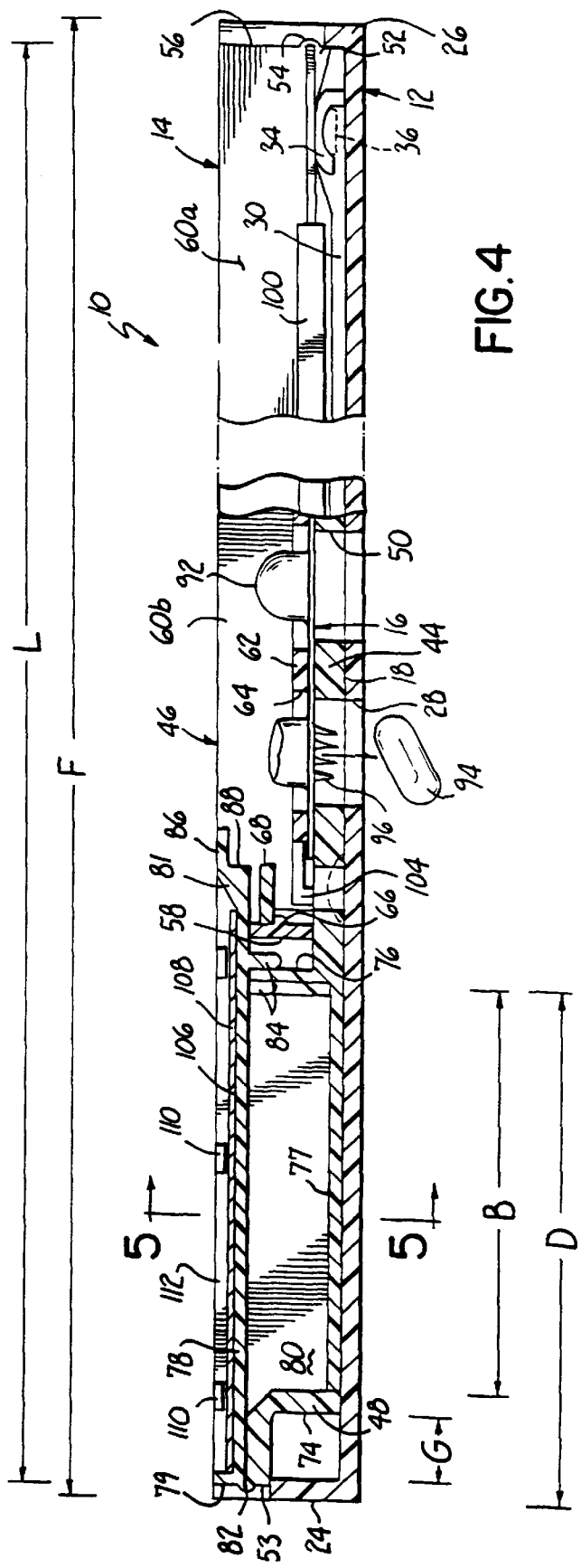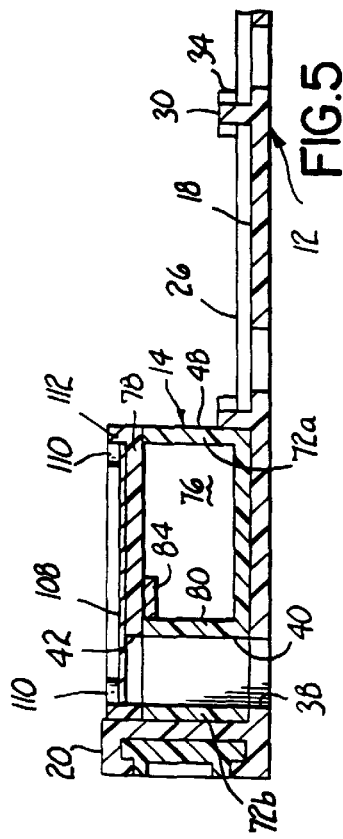

6,082,544

MEDICINE UNIT DOSE DISPENSING SYSTEM AND METHOD

FIELD OF THE INVENTION

This invention relates to medicine dosing systems. More specifically, this invention relates to a system for dispensing unit doses of medication from a reusable dispensing cartridge that uses medication blister strips.

BACKGROUND OF THE INVENTION

Medication dispensing systems, wherein a healthcare provider such as a long-term care center periodically receives pre-filled medication dispensing containers in exchange for previously used and empty similar containers, have taken various forms and are known to the prior art. For example, as disclosed in U.S. Pat. No. 4,384,649, unit doses of medication that are individually packaged within disposable blister-type packs have been contained within reusable plastic dispensers, the medication unit dose being dispensed from the blister pack using finger-strength pressure. In this two-piece dispensing package, the blister pack and its cover is held within an outer shell, whereupon closing of the outer shell forces a cutting edge thereof into contact with the blister pack cover, thereby forming a seal around each blister pack pocket. Other exchangeable unit dose systems have also been available, such as those shown in U.S. Pat. Nos. 4,084,695, 4,253,572, and 4,372,445. These patents generally describe plastic pillbox designs which receive a plurality of unit dose tablets of the like. The pillbox is sealed by a clear plastic cover having a plurality of frangible portions which enable individual compartments of the pillbox to be separately opened for dispensing operations. The cover can be provided of a relatively clear or transparent material to provide visual access to the medication compartments. In U.S. Pat. No. 5,377,839, a disposable blister strip is slidably insertable into a reusable medication cartridge which, in turn, is slidably insertable into a reusable frame. But, when a unit dose of medicine is forced through a membrane sealing the blister strip, torn portions of the membrane are left protruding through openings in the cartridge and frame, and it proves difficult to remove a spent blister strip from the cartridge with this system.

Another prior art unit-dose medication handling system comprises a medication tray having a plurality of dividers for defining compartments for receiving unit-dose dispensing boxes. The dispensing boxes are generally made of cardboard and are adapted to receive a plurality of unit-dose packs of medication. The unit doses may be in the form of separate vials, capsules, envelopes, or strip packs. A pressure sensitive label is adhered to the box for identification. A tray can be used for a single patient, wherein a plurality of prescription boxes can be placed in the adjacent compartments, with a pharmacist filling each box with a predetermined number of unit doses. A tray can also be disposed on a shelf of a moveable medication cart for use in dispensing procedures.

While there have been a variety of exchangeable unit dosing systems, such as described above, each has its own shortcomings. Generally speaking, there has not been available a single system which combines the advantages of using a pharmaceutical manufacturer's own unit dose medication packaging with the practical benefits of a reusable medicine dosage dispenser to minimize inventory and re-ordering requirements, eliminate medication re-packaging and product waste, increase medication security, and increase patient security, yet is simple and easy to use. The exchangeable systems described above do not offer all of the advantages in a single and relatively simple medicine unit dose dispensing system.

OBJECTIVES OF THE INVENTION

It is an objective of the present invention to provide a medication dosing system in which a fresh blister strip is more easily inserted into, and a spent blister strip removed from, a modular reusable blister strip cartridge.

It is another objective of the present invention to provide a medication dosing system in which a user can more easily place a reusable blister strip cartridge in functional engagement with and remove it from, a reusable dispensing frame particularly adapted to receive plural such cartridges.

It is a further objective of the present invention to provide a medication dosing system in which a user may more easily determine medicine and patient information from an identification card integral with the system.

SUMMARY OF THE INVENTION

The objectives of the present invention are achieved with a medicine unit dose dispensing system that allows a user to use original blister strip pre-packaging in a unit dose medication system that has a reusable dispensing frame with a plurality of frame rows, each row having a plurality of longitudinally positioned frame holes adapted to overlie the individual unit dose blisters of a medicine filled blister strip. Also defined in each frame row is a frame slot. A separable and reusable blister strip cartridge securely holds the blister strip in operative assembly with the cartridge through use of a locking arm moveable between release and capture positions relative to a cartridge base. Both the cartridge base and the locking arm define a plurality of holes which substantially overlie the frame holes when the cartridge is placed in functional engagement with the frame. Unit doses of medication are dispensed through the holes in the cartridge and subsequently pass through the holes in the frame when a user applies pressure to a blister member for breaking a frangible membrane and releasing a single unit dose. An empty blister strip can be removed from and a filled blister strip can be located in assembly with, the cartridge whether that cartridge is assembled with the master dispensing frame or not.

The cartridge also has a pillbox for holding an extra unit dose of medicine, if desired. The pillbox has a floor and a top, each with respective slots which overlay the frame slot when the cartridge is placed in functional engagement with the frame. An identification card having electronically scannable bar code information indicia is attached to the box top so that the bar code is readable through the box top slot, box floor slot, and frame slot when the cartridge is functionally engaged with the frame and scanned from beneath the dispensing frame floor.

In the preferred method of the present invention, a user places the cartridge in functional engagement with the frame so that each of the cartridge holes and arm holes, and box floor slot and box top slot substantially overlie the respective frame holes and frame slot, when the locking arm is in a capture position and the box top is in the closed position. The user then places the box top in an open position and lifts the locking arm into a release position uncovering the cartridge's base. The user then drops a blister strip containing unit doses of medicine onto the cartridge base so that each unit dose of medicine substantially overlies a respective cartridge hole, and then swings the arm back to the capture position. The user places a single unit dose of medication in the pillbox and moves the box top back to the closed position. The user then attaches an information card having electronically readable bar code information on one side to the box top so that the bar code information is readable through the box slot and frame slot when the cartridge is in functional engagement with the frame.

Other advantages of the invention will become more apparent to those of ordinary skill upon review of the following detailed description of the preferred embodiment taken in conjunction with the accompanying drawings.

BRIEF DESCRIPTION OF THE DRAWINGS

FIG. 2 is a perspective view of a medicine cartridge in functional engagement with a medicine frame;

FIG. 3 is a partially cutaway side view of the dispensing system of FIG. 1;

FIG. 4 is a partially cutaway side view of a blister strip captured in the cartridge in functional relationship with the frame; and FIG. 5 is a cross section of FIG. 4 taken along line 5—5.

DETAILED DESCRIPTION OF THE PREFERRED EMBODIMENT

Figure 1:
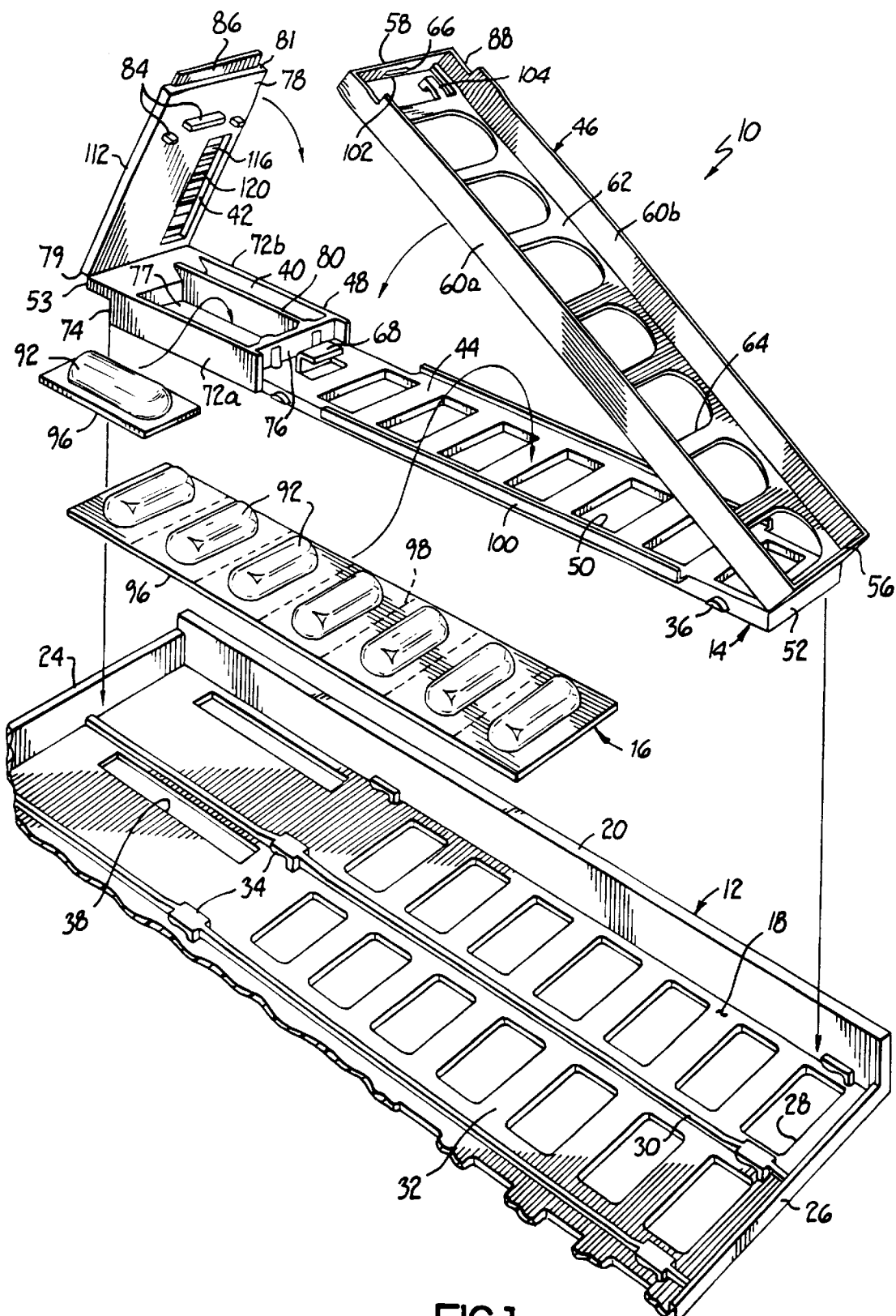
FIG. 1 is a disassembled perspective view of the present inventive medication dispensing system and method.

As seen in FIGS. 1 and 2, a medication dispensing system 10 has a dispensing frame 12 for holding plural blister strip cartridges 14, the blister strip cartridge 14 adapted to receive a medicine blister strip 16. The dispensing frame 12 has a frame surface 18 having a top wall 20, a bottom wall 22, a first lip 24, and a second lip 26. In the preferred embodiment, the top and bottom walls 20, 22 are of substantially equal height, while the first lip 24 and the second lip 26 each have heights generally lower than that of the top and bottom wall 20, 22. The frame surface 18 defines a plurality of longitudinally positioned frame holes 28. In the preferred embodiment, a partition 30 subdivides the frame surface 18 into plural rows 32. In the preferred embodiment, detents 34 are formed on the partition 30, the top wall 20, and the bottom wall 22 for receiving a block 36 on the blister strip cartridge 14 in order to place the blister strip cartridge 14 in functional engagement with the dispensing frame 12 as further discussed below. The frame surface 18 also defines a frame slot 38 in each row 32, the frame slot 38 substantially aligning with an analogous box slot 40 and top slot 42, each defined in the blister strip cartridge 14, as further discussed below.

The blister strip cartridge 14 has a total length L that is substantially coextensive with the total frame length F, as seen in FIG. 4. The blister strip cartridge 14 is generally comprised of a base 44, a locking arm 46 and a pillbox 48. The cartridge base 44 has blocks 36 attached to edges of the base 44 that cooperate with the detents 34 on the dispensing frame 12 to secure the blister strip cartridge 14 in functional relationship with dispensing frame 12. The cartridge base 44 defines a plurality of base holes 50 which substantially overlie the frame holes 28 when the blister strip cartridge 14 is operationally engaged with the dispensing frame 12.

The blister strip cartridge 14 has an cartridge second end 52 that substantially abuts the frame second lip 26 and an cartridge first end 53 proximate to the first lip 24 when the blister strip cartridge 14 is in operational engagement with the dispensing frame 12. The locking arm 46 is attached to the cartridge second end 52 with a hinge 54 in order to allow the locking arm 46 to move from a capture position substantially overlying the cartridge base 44, to a release position in which is the locking arm 46 is raised away from the cartridge base 44, as seen in FIGS. 1–4. In the preferred embodiment, the hinge 54 attaching the locking arm 46 to the cartridge second end 52 of the blister strip cartridge 14 is a living hinge. The locking arm 46 has a hinge wall 56, a lock wall 58, opposing side walls 60a, 60b, 15 and a base cover 62. The cover 62 defines arm holes 64 that substantially overlie the base holes 50 when the locking arm 46 is in the capture position.

The locking arm 46 is secured to the cartridge base 44 with a catch tab 66 located on the lock wall 58. The tab 66 frictionally engages an L-shaped catch 68 depending from the base 44. The box 48, located adjacent to the cartridge first end 53, has opposing box sides 72a, 72b, outer and inner box walls 74, 76, a top 78, a floor 77, and a divider 80. The top 78 has a hinge edge 79 and a lip edge 81 and is swingably attached to the cartridge first end 53 of the blister strip cartridge 14 in order to move from a closed position engaged with the top edges of the outer and inner box walls 74, 76, and opposing box sides 72a, 72b, to an open position allowing a user access to the interior of the box 48. In the preferred embodiment, the top 78 is attached to the cartridge first end 53 with a box hinge 82, i.e., a living hinge. When the top 78 is in the closed position, friction members 84 engage the top edge of the inner box wall 76 in order to maintain the top 78 in its closed position. The top 78 has a lip 86 extending from the lip edge 81 which overlays an arm seat 88 when the locking arm 46 is in the capture position and the top 78 is in the closed position.

As seen in FIG. 4, there is a gap G between the outer box wall 74 and the frame first lip 24 when the cartridge is in functional engagement with the dispensing frame 12. The gap G, which is substantially the difference between the length of the box B and the distance D between the box inner wall 76 and the cartridge first end 53 of the blister strip cartridge 14, allows a user to place the blister strip cartridge 14 against the frame surface 18 before sliding the blocks 36 on the cartridge into functional engagement with the detents 34 on the dispensing frame 12. The box slot 40 is defined in the floor 77 so that it substantially overlays the frame slot 38 when the blister strip cartridge 14 is in functional engagement with the dispensing frame 12, as seen in FIG. 5. Likewise, the top slot 42 defined in the top 78 substantially overlays the box slot 40 when the top 78 is in its closed position.

When the locking arm 46 is raised to its release position and the top 78 is raised to its open position, the hinge wall 56 of the locking arm 46 and the hinge edge 79 of the top 78 tilt out over the respective second and first frame lips 26, 24 which, when the blister strip cartridge 14 is in functional engagement with the dispensing frame 12, do not rise high enough on the cartridge's respective cartridge first and second ends 52, 53 so as to interfere with the movement of the locking arm 46 and the top 78 as they move to their respective release and open positions.

In the preferred embodiment, the locking arm 46 captures a blister strip 16 against the cartridge base 44. The blister strip 16 has plural blister members 92, each enclosing a unit dose of medicine 94 with a portion of a frangible membrane 96, the portion of the frangible membrane 96 sealing a discrete blister member 92 has an electronically scannable bar code (not shown) marked on its surface. When a user breaks the membrane 96 to release a unit dose 94, the bar code on the membrane 96 is torn and no longer is able to be scanned. The frangible membrane 96 is placed in frictional engagement with the base 44 so that the blister members 92 substantially overlie the base holes 50. In the preferred embodiment, the blister strip 16 defines perforations 98 between each blister member 92 so that a user may select how many unit doses 94 to capture by simply separating a desired number of blister members 92 from the remainder of the blister strip 16.

In the preferred embodiment, in order to facilitate the capture of the blister strip 16, and to locate the locking arm 46 in the capture position, the blister strip cartridge 14 has a pair of oppositely disposed upwardly directed flanges 100 along opposite edges of the blister strip cartridge 14. Also in the preferred embodiment, the locking arm 46 defines a space 102 adjacent to the lock wall 58, into which a pair of pawls 104 extend from the cover 62. The pawls 104 help to locate the blister strip 16 on the cartridge base 44 so as to locate each blister member 92 substantially over a respective base hole 50.

In the preferred embodiment, as seen in FIG. 2, the top 78 has a top side 106 onto which an identification card 108 is placed in frictional engagement and secured thereto by tabs 110 attached to raised edges 112 along the margin of top 78. The identification card 108 has a front 114 and a back 116, the front 114 having front information indicia 118 imprinted thereon, e.g., a patient's name and prescription information, and the back having back information indicia 120 imprinted thereon, preferably in the form of a bar code readable with an electronic scanner known in the art (not shown). The back information indicia 120 would also contain patient information, e.g., the patient's name and prescription information. When the identification card 108 is frictionally engaged with the top 78, the information indicia 120 is readable with the electronic scanner through the top slot 42 and the box slot 40 when the top 78 is placed in the closed position. Also, the bar code is readable through the frame slot 38 when the cartridge is in functional engagement with the dispensing frame 12 and the top 78 is placed in the closed position, as seen in FIG. 5.

In the method of the present inventive medicine dispensing system 10, a user assembles the blister strip cartridge 14 to the dispensing frame 12 by first placing the blister strip cartridge 14 against the dispensing frame 12 and then adjusting the blister strip cartridge 14 so that the cartridge base 44 is frictionally engaged with the frame surface 18. Next, the user slides the blister strip cartridge 14 along the frame surface 18 so that the blocks 36 on the blister strip cartridge 14 move against the detents 34 on the dispensing frame 12, thereby, placing the blister strip cartridge 14 in functional engagement with the dispensing frame 12. The user swings the top 78 to its open position and swings the locking arm 46 to its release position. The user then drops a blister strip 16 in frictional engagement with the cartridge base 44 so that each blister member 92 substantially overlies a respective base hole 50. The locking arm 46 is then swung to its capture position, thereby, capturing the blister strip 16 against the cartridge base 44, each blister member 92 rising through a respective arm hole 64 which substantially overlies a respective base hole 50. The user then inserts a single blister member 92 with a unit dose of medicine 94 secured therein in the pillbox 48 and then places the top 78 in the closed position to secure the unit dose of medicine 94 therein. The user then places an identification card 108 in frictional engagement with the top 78 so that the back information inclicia 120 is readable through the box slot 40 and the dispensing frame 12 with the blister strip cartridge 14 assembled thereto.

Additional advantages and modifications will readily appear to those skilled in the art. The invention in its broader aspects is therefore not limited to the specific details, representative apparatus and illustrative examples shown and described. This has been a description as the present invention is currently known. However, the invention itself should only be defined by the appended claims, wherein we claim.

What is claimed is:

1. A medication dispensing system for dispensing unit doses of medication from a blister strip, the blister strip comprising a series of blister members each sealed by a frangible membrane, and each containing a unit dose of medicine, said system comprising:

a dispensing frame having a plurality of longitudinally arranged frame holes defined in a frame floor, said dispensing frame having a frame lock member; and a blister strip cartridge for selectable engagement with said dispensing frame, said cartridge having a cartridge lock member engageable with said frame lock member for locking said dispensing frame and said cartridge in operational assembly, said cartridge having a base and a swingable locking arm each of which define a plurality of longitudinally arranged cartridge holes adapted to overlie said frame holes when said dispensing frame and said cartridge are operatively assembled, said swingable locking arm being movable from a capture position substantially overlying said base to trap a blister strip therebetween and a release position uncovering said base, said cartridge having a pill box for holding a unit dose of medicine, said box having a top, wherein said top is swingably attached to said pill box for selectively moving said top from a closed position, sealing said box, to an open position allowing a user to gain access to the interior of said box, said top having a top lip which overlies said locking arm when said locking arm is in said capture position and said top is in said closed position, wherein a trapped blister strip can be removed from said cartridge, said cartridge and said dispensing frame being structured so that said locking arm can be swung between said release and capture positions whether said cartridge is engaged or not in operative assembly with said dispensing frame.

2. The dispensing system of claim 1, said dispensing frame further comprising:

a partition substantially coextensive with said frame defining a plurality of longitudinal rows.

3. The dispensing system of claim 2, wherein said frame lock member is attached to said partition.

4. The dispensing system of claim 1, said cartridge further comprising:

a tab attached to said locking arm; and a catch attached to said base for receiving said tab when said locking arm is in said capture position to secure said locking arm in said capture position.

5. The dispensing system of claim 1, said cartridge further comprising at least one pawl attached to said locking arm to locate the blister strip within said cartridge when said locking arm is in said capture position.

6. The dispensing system of claim 1, wherein said locking arm has a seat portion for receiving said top lip when said locking arm is in said capture position and said top is in said closed position.

7. The dispensing system of claim 1, said pillbox further comprising at least one friction member on said top for engaging said box in order to secure said top in said closed position.

8. A medication dispensing system for dispensing unit doses of medication contained in a blister strip, the blister strip having a series of blister members each sealed by a frangible membrane, and each containing a unit dose of medicine, said system comprising:

a dispensing frame having a frame floor, a frame slot defined in said frame floor, and a frame lock member;

a blister strip cartridge for selectable engagement with said dispensing frame, said cartridge having a cartridge lock member connectable with said frame lock member for locking said dispensing frame and said cartridge in functional relationship;

a pillbox mounted on said cartridge, said pillbox having a floor and a box slot defined in said floor, said box slot substantially overlying said frame slot when said cartridge is in functional engagement with said dispensing frame, said pillbox having a top moveable from an open position allowing access to said box to a closed position sealing said box, said box top having a top slot substantially overlying said box slot when said top is in said closed position; and an identification card having a front and a back, said card back having information indicia marked thereon, said card being attachable to said top so that said indicia is readable through each of said top slot, said box slot, and said frame slot when said top is in said closed position and said cartridge is in functional assembly with said dispensing frame.

9. The dispensing system of claim 8, wherein said frame has at least one detent attached thereto.

10. The dispensing system of claim 9, wherein said blister strip cartridge has at least one block attached thereto for engaging said detent on said dispensing frame to place said cartridge in operational engagement with said dispensing frame.

11. The medication dispensing system of claim 8, wherein said dispensing frame defines a plurality of longitudinally positioned holes.

12. The dispensing system of claim 11, wherein said cartridge defines a plurality of cartridge holes that substantially overlie said frame holes when said cartridge is operationally engaged with said dispensing frame.

13. The dispensing system of claim 8, wherein said information indicia marked on said back of said card is readable through said frame slot when said cartridge is operationally engaged with said dispensing frame and said top is in said closed position.

14. The dispensing system of claim 8, further comprising a locking arm swingably attached to said cartridge, said locking arm moveable from a capture position substantially overlying said cartridge to a release position uncovering said cartridge, said locking arm defining arm holes substantially overlying said cartridge holes when said locking arm is in said capture position, wherein said top substantially overlies said locking arm when said locking arm is in said capture position and said top is in said closed position.

15. The dispensing system of claim 8, said pillbox further comprised of:

a box divider substantially coextensive with said box, said divider preventing a unit dose of medicine in said box from overlying said box slot.

16. A periodic medication dispensing system for dispensing prepackaged unit doses of medication contained in a blister strip having at least one blister member with a unit dose of medication held therein by a frangible membrane, said system comprised of:

a dispensing frame having a first lip, a second lip, a frame surface, a frame length, at least one partition substantially coextensive with said frame surface, a plurality of longitudinally arranged holes corresponding to the days of the week defined in said frame surface, and a frame slot defined in said frame surface, said first and second lips having respective first and second lip heights, said dispensing frame having at least one detent attached thereto; and a blister strip cartridge for selectable engagement with said dispensing frame, said cartridge having a length substantially coextensive with said dispensing frame, a cartridge base defining a plurality of base holes, at least one block on said base for placing said base in operational engagement with said dispensing frame, an cartridge first end defining a notch to facilitate placing said cartridge in functional engagement with said dispensing frame, an cartridge second end forming a living hinge with a locking arm moveable from a capture position overlying said base to a release position raised from said base, said locking arm defining arm holes that substantially overlie said base holes when said locking arm is in said capture position, wherein the blister strip is locatable on said base so that the frangible membrane is frictionally engaged with said base, said locking arm capturing the blister strip when said locking arm is in said capture position, said locking arm having a tab selectively engageable with a catch attached to said cartridge base, said base having a pair of oppositely disposed flanges to aid in locating said locking arm in said capture position, wherein said cartridge has a pillbox with a floor defining a box slot substantially overlying said frame slot when said cartridge is operationally engaged with said dispensing frame, a box outer wall, a top swingably attached to said pillbox, said top moveable from a closed position sealing said box to an open position allowing a user access to the inside of said box, said top defining a top slot that substantially overlies said box slot when said top is in said closed position, said pillbox having at least one friction member located on said top for securing said top in said closed position, and a box lip that overlays a portion of said locking arm when said locking arm is in said capture position and said top is in said closed position, said top being adapted to receive an identification card having electronically scannable information thereon, said information being scannable through said top slot, said box slot, and said frame slot when said top is in said closed position and said cartridge is operationally engaged with said dispensing frame.

17. A method of exchanging a blister strip in a reusable medication dispensing system, said system comprising a dispensing frame, and a blister strip cartridge selectively engageable with and disengageable from said frame, said cartridge having a cartridge base for receiving a blister strip, a swingable locking arm attached to said cartridge for capturing said blister strip in assembled relation with said base, and a pill box with a top moveable from a closed position adjacent to and overlying a portion of said locking arm to an open position removed from said locking arm, said method comprising the steps of:

moving said pill box top from said closed position to said open position;

swinging said locking arm between a capture position securedly holding said blister strip in operative engagement with said cartridge base and a release position allowing said blister strip to be disengaged from said base, said swinging step being performable whether said cartridge is operationally engaged with said dispensing frame or not as desired by the user;

removing a first blister strip from assembled relation with said base when said locking arm is in said release position;

dropping a second blister strip into assembled relation with said base while said locking arm is in said release position;

swinging said locking arm to said capture position from said release position; and moving said pill box top from said open position to said closed position.

18. A method of reading an identification card with information indicia thereon as used in a medicine unit dose dispensing system, said system comprising a dispensing frame with a frame slot in a frame floor, a blister strip cartridge having a pillbox with a floor slot and a top slot, said dispensing frame having a frame lock member and said cartridge having a cartridge lock member for holding said dispensing frame and cartridge in operative combination, said method comprising the steps of:

assembling said identification card with said pillbox so that at least a portion of said information indicia is visible through said top slot, connecting said cartridge with said dispensing frame so that said frame slot, floor slot and top slot are substantially aligned; and reading that portion of said information indicia visible through said top slot from the underside of said frame floor through said frame slot, said floor slot and said top slot.

* * * * *